Patented Oct. 17, 1939

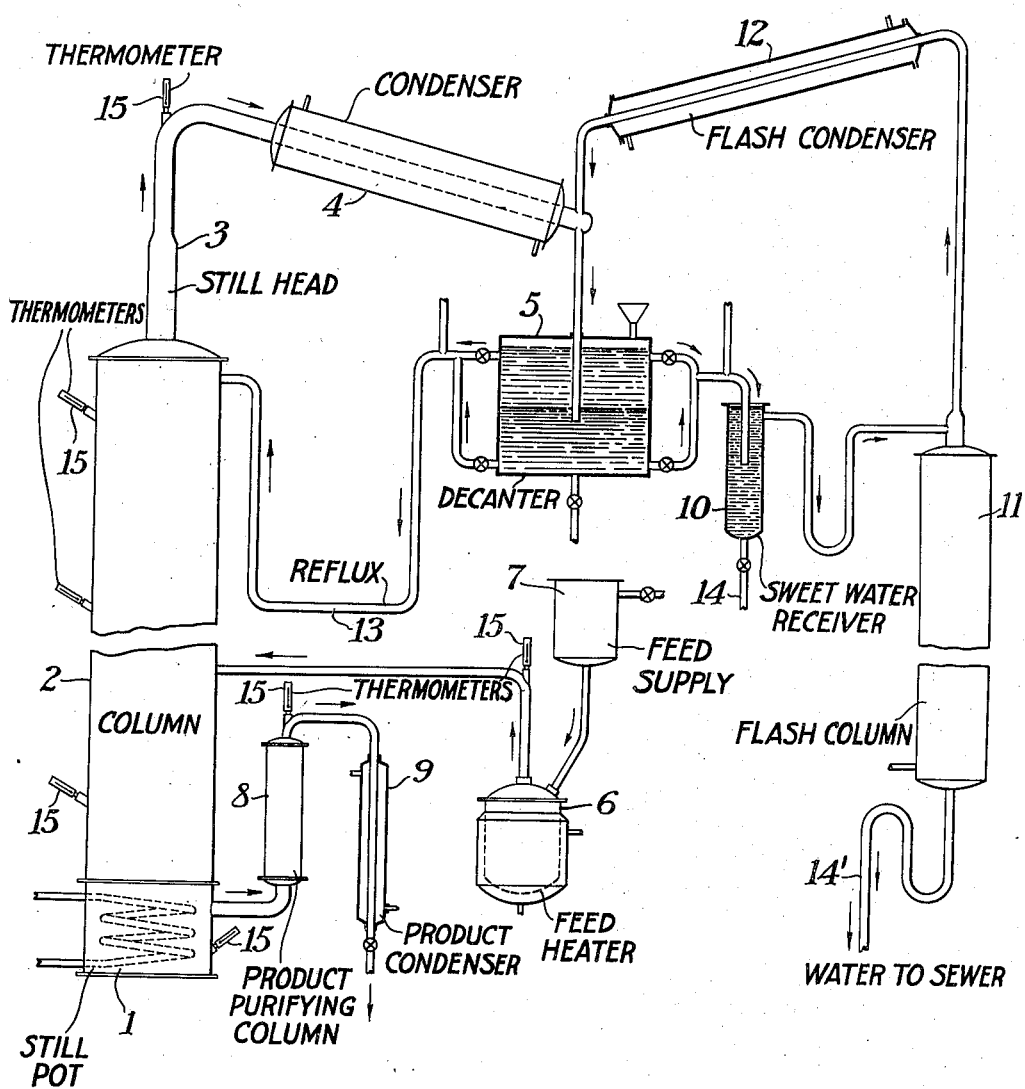

2,176,500

UNITED STATES PATENT OFFICE 2,176,500

PROCESS OF CONCENTRATING AQUEOUS ALIPHATIC ACID SOLUTIONS BY MEANS OF SEVEN CARBON ATOM ALIPHATIC ESTERS AND FIVE CARBON ATOM ALIPHATIC ALCOHOL ENTRAINERS

Campbell C. Hyatt, Jr., Kingsport, Tenn., assignor, by mesne assignments, to Eastman Kodak Company, Rochester, N. Y., a corporation of New Jersey Application July 25, 1936, Serial No. 92,682

3 Claims. (Cl. 202—42)

This invention relates to processes for removing water from aqueous aliphatic acids by azeotropic distillation with entraining agents, and more particularly to processes employing entraining agents comprised of seven carbon atom esters and five carbon atom alcohols.

As is well known, the usual methods of straight rectification for separating liquids are practically impossible for dilute aliphatic acid, such as aqueous acetic acid. Consequently, the use of entraining agents, also referred to as withdrawing agents, have been adopted. The following general procedure has usually been considered necessary, namely, excess entraining agent was employed to remove the water and produce a mixture of entraining agent and acetic acid, for example, after which these constituents were separated, in order to recover the acid.

Various entraining agents have been developed. For example, propylene chloride, which forms an azeotropic composition comprised of 88% propylene chloride and 12% water is quite well known. A number of acetate and alcohol entraining agents which are quite satisfactory have been disclosed in Jack J. Gordon application, Serial No. 744,250, now Patent No. 2,049,440. Since in azeotropic distillation of the aliphatic acids, as usually encountered in the art, the water is removed from the acid in the form of an azeotrope having a boiling point below both the boiling point of acetic acid and water, apparently, the tendency in the art has been to avoid entrainers which possess boiling points materially above the boiling point of acetic acid.

I have found that there are certain materials having relatively high boiling points which may be employed in the dehydration and concentration of aliphatic acids by azeotropic distillation. This invention has as an object to provide a process of removing water from dilute solutions of acetic, propionic and other aliphatic acids or mixtures thereof by azeotropic distillation with an entraining agent comprising a seven carbon aliphatic ester and a five carbon aliphatic alcohol. Another object is to provide a process for the azeotropic distillation of crude aqueous solutions of aliphatic acids, such as pyroligneous liquor, by means of entraining agent, including a seven carbon aliphatic ester. Still another object is to provide a process in which the finally dehydrated acid is not materially contaminated with dehydrating agent. A further object is to provide a process including azeotropic distillation with an entrainer comprised of a seven carbon aliphatic ester and a five carbon aliphatic alcohol wherein the azeotropic composition is formed in a zone separate from the zone containing the concentrated acid. Another object is to provide a process for operating a distillation unit wherein there is a definite relationship maintained between the acid feed and the entrainer content.

I have found that entraining agents comprised of seven carbon aliphatic esters with five carbon aliphatic alcohols, although having relatively high boiling points, give highly desirable results in processes for the dehydration of aqueous aliphatic acids by azeotropic distillation. I have found that by subjecting various aqueous solutions containing aliphatic acids, such as acetic acid, to azeotropic distillation, in the presence of agents, such as normal amyl acetate and normal amyl alcohol, or isoamyl acetate and isoamyl alcohol, that water may be efficiently removed from such systems as a ternary azeotrope boiling below the boiling point of water.

My process may be carried out in fractionating columns suitable for azeotropic distillation. For example, the apparatus shown in Othmer Patent 2,028,800, Gordon applications Serial Nos. 744,250, now Patent No. 2,049,440, and 26,226, now Patent No. 2,049,441, may be employed for carrying out my process. I have found that my entrainer comprising a seven carbon aliphatic ester and a five carbon aliphatic alcohol possesses all the desirable requisites of an organic agent for use in the dehydration of dilute aliphatic acids by azeotropic distillation. Further details concerning my new entrainer may be observed from a consideration of the following.

The following data for the isoamyl acetate-isoamyl alcohol system have been obtained on isoamyl alcohol derived from commercial fusel oil:

DATA (a) *Azeotrope ratios for entrainer compositions*

| Entrainer percent ester | Comp. percent alcohol | Azeotrope percent entrainer | Comp. percent water | Percent water in entrainer layer | B. P. of azeotrope |
|---|---|---|---|---|---|
|  |  |  |  |  | ° C. |
| 90 | 10 | 64.3 | 35.7 | 1.92 | 93.8 |
| 80 | 20 | 63.8 | 36.2 | 2.25 | 93.6 |
| 70 | 30 | 63.5 | 36.5 | 3.33 | 93.6 |
| 60 | 40 | 62.8 | 37.2 | 3.96 | 93.6 |
| 50 | 50 | 62.4 | 37.6 | 5.20 | 93.6 |

(b) *Distribution ratios of acetic acid between entrainer and water layer for various entrainer compositions*

| Entrainer composition | | Distribution ratio $K = \dfrac{C_{solvent}}{C_{water}}$ |
|---|---|---|
| Ester | Alcohol | |
| 90 | 10 | 0.577 |
| 80 | 20 | 0.699 |
| 70 | 30 | 0.746 |
| 60 | 40 | 0.807 |
| 50 | 50 | 0.871 |

The ester alcohol composition is given as the per cent alcohol at the beginning of the determination and does not indicate the equilibrium composition of alcohol in the ester layer.

From the above data, it may be seen that my new entrainer may carry over in its azeotropic composition as much as approximately 37% water. On the other hand, the well-known entrainer, propylene chloride, carries over only 12% of water, and the well-known entrainer normal propyl acetate, only about 14% water. It is, therefore, apparent that my new entrainer possesses improved properties over prior art entrainers. While the above data has been set forth with respect to an isoamyl acetate and isoamyl alcohol system, my invention is not limited to this entrainer. For example, similar results may be obtained with a normal amyl acetate and normal amyl alcohol system. Such a system, with the pure components, such as pure normal amyl acetate, boiling at approximately 148.8° C., will form a ternary azeotrope boiling at 94.8° C. and having the following composition:

|   | Per cent |
|---|---|
| Normal amyl acetate | 10.5 |
| Normal amyl alcohol | 33.3 |
| Water | 56.2 |

These values may vary somewhat, provided the normal amyl acetate is not pure. Likewise, it may be stated with respect to pure isoamyl acetate boiling at 142° C. that a ternary azeotrope boiling at 93.6° C. is possible which has the following composition:

|   | Per cent |
|---|---|
| Isoamyl acetate | 24. |
| Isoamyl alcohol | 31.2 |
| Water | 44.8 |

I have found that in operating a distillation column with a seven carbon aliphatic ester and a five carbon aliphatic alcohol as an entrainer, such as, for example, isoamyl acetate with isoamyl alcohol, an entrainer composition in the neighborhood of approximately 75% of the seven carbon aliphatic ester with approximately 25% of the five carbon aliphatic alcohol is quite satisfactory. However, as apparent from a consideration of the above data, the composition of my entrainer may be varied over a considerable range, say from about 5% alcohol to as high as 50 or 60% alcohol, the seven carbon aliphatic ester varying accordingly.

With an entrainer composition of approximately 75-25, the azeotropic ratio is approximately 1.755:1 by weight and the water dissolved in the ester layer is approximately 2.8%. Therefore, it is apparent that my new entrainer would produce a material steam saving over prior art entrainers, as well as give an increased capacity to an azeotropic distillation system in which my new entrainer is employed.

As already pointed out, my new entrainer may be employed in any of the usual types of distillation apparatus. However, for purposes of illustration, reference will be made to the apparatus disclosed in the attached drawing which forms a part of the present application. In the accompanying drawing, in which like reference characters refer to like parts:

Figure 1 is a semi-diagrammatic side elevation of one form of apparatus in which my process may be carried out, certain parts being shown on an exaggerated scale, and other parts shown broken away for clarity.

In Figure 1, the numeral 1 represents a still pot or base heater. Positioned above this heater means is a column construction 2. This column may include bubble plates, packing or other type construction generally employed in distillation apparatus. In carrying out my process on a large scale, a column still of between 30 and 60 plates would generally be satisfactory.

A feeding device and supply may be provided intermediate of the column as at 15. This feeding equipment may comprise a vaporizer or feed heater 6 which is connected to feed supply 7.

At the head of column 2 is provided a vapor outlet 3 which leads to condenser 4. Any condensate accumulating therein may be conducted to the decanter or separator 5.

One portion of the decanter is connected to sweet water receiver 10, and the other portion is connected through conduit 13 so as to furnish reflux for column 2.

The water receiver 10 is connected to flash column 11 which, in turn, is connected through condenser 12 back to decanter 5. Conduits 14 and 14' are provided on the sweet water receiver and flash column, so that waste water may be eliminated therefrom. Suitable thermometers and other measuring and recording devices are attached to the apparatus at various points. The heating of the apparatus, operation of the condensers and other details are carried out in the manner as fully disclosed in the above-mentioned Othmer and Gordon patents. Hence, further description of my apparatus appears unnecessary.

Assuming my new entrainer is to be employed in an azeotropic process which operates continuously, the procedure is as follows: In the top portion of column 2 there exists a constant boiling composition of isoamyl acetate, isomyl alcohol and water. This vaporous mixture passes over through condenser 4 where it is condensed into a liquid mixture which then passes into the decanter or separator 5.

In this separator the amyl acetate and amyl alcohol separate from the water carried over. The amyl acetate and amyl alcohol may be returned through conduit 13 to the head of the column. The water layer may be collected at 10 and discharged to waste or passed to flash column 11 where any amyl acetate and amyl alcohol contained therein may be recovered and returned to the system through condenser 12.

If desired, a portion of the amyl acetate and amyl alcohol being returned through conduit 13 may be conducted to a lower point in the column for the purpose of maintaining the acetate and alcohol in the desired ratio, as more fully described and claimed in Gordon and Bright copending application Serial No. 26,227.

The aqueous aliphatic acid, either in the form of acid and water or in the form of an extract comprising acid, water and solvent, may be fed to column 2 in either the liquid or vaporous condition. I prefer to employ vapor feed in view of the several advantages obtained. However, I have found that generally in employing vapor feed it is highly desirable that the vapor feed should not be too high on the column. That is, the vapor feed to the column should, under usual conditions, be in the lower one-third of the column, assuming a single vertical column is being employed. If a two-column structure is employed, the feed would generally be in the neighborhood of the lower half of the lower column.

When operating column 2 with my new seven carbon atom aliphatic ester and five carbon atom aliphatic alcohol as an entrainer, I prefer to employ a procedure wherein the entraining agent does not appear below the aqueous acid feed. Also, the lower portion of the column, where fully dehydrated and concentrated acid may be found, is maintained free of entrainer at all times. Such procedure produces pure dehydrated aliphatic acid uncontaminated with entraining agent, and requires the use of less entraining agent than may be required with certain other processes. Satisfactory procedure is set forth in detail in Jack J. Gordon application Serial No. 26,226, now Patent No. 2,049,441.

While it is preferred to employ the procedure just described, it is also possible to employ my new seven carbon atom aliphatic ester and five carbon atom aliphatic alcohol entrainer in accordance with other procedure. For example, my new entrainer may be employed in the process and apparatus shown in Othmer Patent 2,028,800, or it is possible to employ my new entrainer in well-known prior art procedure where the withdrawing agent is employed in excess. Under such conditions, while a dehydrated aliphatic acid may be readily obtained, the acid may be contaminated to some extent with entraining agent and the operation of such a process may require the use of an amount of entraining agent larger than necessary with the aforementioned Gordon or Othmer procedure.

In any event, whatever procedure column 2 may be operated under, dehydrated acid forms in base heater 1. This acid may be drawn directly from the base heater, but preferably is vaporized through the refining column 8 and condensed by means of condenser 9, from which the dehydrated acid may be conducted to any desired use.

As indicated above and as apparent from a consideration of the distribution ratio constant, K, my new entrainer may be employed as an extracting agent. That is, aqueous acetic acid may be extracted with my seven carbon atom aliphatic ester and five carbon atom aliphatic alcohol agent. The extraction may be carried out in accordance with any well-known procedure, and in known apparatus, but preferably would be carried out in accordance with the apparatus and procedure shown and described in Gordon and Conklin application Serial No. 744,251, now Patent No. 2,129,684.

The resulting extract comprising, for example, amyl acetate and amyl alcohol, acetic acid and some water, would preferably be fed into feed heater 6 and vaporized from there through 15 to column 2, wherein the extract mixture would be subjected to azeotropic distillation in accordance with any of the procedures already described herein.

In employing my new agent in an extraction process as just described, it may be desirable to add a source of water, such as dilute aliphatic acid, to the extract, prior or during feeding. Also, during the distillation, it may be desirable that a portion of the vaporized azeotrope be condensed and returned as reflux. In this condensing and return, both the solvent and water comprising the azeotrope would be returned, rather than only the solvent component of the azeotrope, as is the usual procedure. The other portion of the vaporized azeotrope would be permitted to pass through condenser 4 to decanter 5, where it would be permitted to separate, as already described. The amyl acetate and amyl alcohol layer would then be returned to the extractor to form further extract for feeding into feed heater 6.

I have found that my new entraining agent is quite satisfactory for use in concentrating aqueous acetic acid of a strength between about 20 and 40%, either by extraction or azeotropic distillation, or a combination of this procedure. I have also found that my new entraining agent will satisfactorily concentrate low acetic acid concentration, such as would be obtained from pyroligneous decomposition of wood, as well as concentrations of acetic acids, which may be as high as 70–85% or higher. My new entraining agents may also be used for concentrating propionic and butyric acids alone, and particularly when these higher acids occur in admixture with acetic acid.

While considerable discussion has been directed toward isoamyl acetate-isoamyl alcohol, my invention is not limited to this particular agent, but embraces various other seven carbon atom aliphatic ester and five carbon atom aliphatic alcohol agents. For example, my invention embraces the secondary amyl acetates in admixture with the corresponding alcohols or various admixtures of amyl acetate and amyl alcohol as may result by the utilization of amyl acetate obtained from commercial sources, such as fusel oil.

Although I have shown and described certain specific embodiments of my invention, I am fully aware that a number of modifications thereof are possible. Hence, my invention is not to be restricted except insofar as is necessitated by the prior art and by the spirit of the appended claims.

What I claim as my invention and desire to be secured by Letters Patent of the United States is:

1. A process for concentrating aqueous materials containing at least one of the lower aliphatic acids by azeotropic distillation in a distillation unit, which comprises feeding said aqueous solutions, at least partially in a vaporous condition, to a distillation unit containing withdrawing agent of 50%–90% amyl acetate and 10%–50% amyl alcohol, supplying and maintaining the quantity of amyl acetate and amyl alcohol in the unit insufficient to appear below the aqueous feed, subjecting the materials in the unit to a distillation treatment whereby a distillate containing amyl acetate, amyl alcohol and water is removed from the unit, recovering amyl acetate and amyl alcohol from the distillate and returning it to the upper part of the unit.

2. A process for dehydrating aqueous materials containing at least one of the lower aliphatic acids by azeotropic distillation in a distillation unit, which comprises feeding said aqueous solutions to a distillation unit containing withdrawing agent of 50%–90% isoamyl acetate and 10%–50% isoamyl alcohol, supplying and maintaining the quantity of withdrawing agent in the unit insufficient to appear below the aqueous acid feed, subjecting the materials in the unit to a distillation treatment whereby an azeotropic mixture containing isoamyl acetate, isoamyl alcohol and water is distilled from the unit, recovering isoamyl acetate and isoamyl alcohol from this distillate and returning it to the upper part of the unit.

3. The continuous process for dehydrating aqueous solutions containing at least one lower aliphatic acid by procedure including distillation in a distillation unit with a 50%–90% normal amyl acetate and 10%–50% normal amyl alcohol entrainer, which comprises feeding acetic acid vapor to the distillation unit at a point substantially below the middle thereof, distilling amyl acetate, amyl alcohol and water from the unit, recovering at least a part of the amyl acetate and amyl alcohol therefrom and returning it as reflux to the unit.

CAMPBELL C. HYATT, Jr.